Feb. 8, 1966

E. L. ANGSTADT 3,233,584

COATING PROCESS AND APPARATUS

Filed July 18, 1958

INVENTOR.
ERNEST L. ANGSTADT

BY
*Brumbaugh, Free, Graves & Donohue*
ATTORNEYS.

Feb. 8, 1966  E. L. ANGSTADT  3,233,584
COATING PROCESS AND APPARATUS
Filed July 18, 1958  3 Sheets-Sheet 2

INVENTOR.
ERNEST L. ANGSTADT

BY
*Brumbaugh, Free, Graves & Donohue*
ATTORNEYS.

Feb. 8, 1966  E. L. ANGSTADT  3,233,584
COATING PROCESS AND APPARATUS
Filed July 18, 1958

INVENTOR.
ERNEST L. ANGSTADT
BY
ATTORNEYS

United States Patent Office 3,233,584
Patented Feb. 8, 1966

3,233,584
COATING PROCESS AND APPARATUS
Ernest L. Angstadt, Reading, Pa., assignor to The Polymer Corporation, a corporation of Pennsylvania
Filed July 18, 1958, Ser. No. 749,416
2 Claims. (Cl. 118—429)

This invention relates to improvements in coating articles with heat-fusible pulverulent materials.

Articles to be coated may be made of various materials such as metals including steel, iron, aluminum, copper, zinc, as well as alloys thereof. Coatings have been proposed that are particularly suitable for protecting the surfaces of such articles that are exposed to normally destructive chemicals or corrosive agents, or which must be electrically insulated, or which must resist mechanical abrasive or frictional wear. However, materials that meet the criteria for the field of use frequently, because of the fact that they are refractory to solvents and other chemicals for which these materials may be valued, are difficult to use in the production of coatings by common presently known methods, such as by painting or spraying in a liquid solvent or liquid dispersion form.

Accordingly, it is an object of the invention to provide a new and improved process for the production of uniform coatings without the necessity for using liquid solvents or dispersing agents for the coating materials.

In carrying out the coating process of this invention, the coating material, preferably in the form of pulverulent granules, is transformed into a fluidized bed by introducing a gas under pressure therein as described in the British Patent No. 759,214; the bed being maintained in the fluidized state by controlling the flow of gas. The article to be coated is heated and immersed in the fluidized bed of coating material. Individual particles of the coating material adhere and melt and fuse together with other particles on the hot surface of the immersed portion of the article to form a continuous coating thereon as described more fully below.

The heating of the article should be to a temperature above the sintering or melting point of the coating material. By "melting point" is here meant that stage wherein the coating material is sufficiently coalesced to provide a continuous coating of the article. By "sintering point" is here meant that stage wherein the coating material is sufficiently "tacky" or "sticky" to adhere to the surface of the article.

In practicing the process of coating heated articles by immersion in fluidized beds of dry pulverulent solid coating materials, as described in the British patent, it has become apparent that simple immersion in the fluidized bed often is not sufficient to cause the formation of a complete, uniform and smooth coating on the article which is immersed. This observation is particularly true with respect to articles having potentially downwardly facing surfaces or marked recesses, concavities or irregularities in their surfaces.

Therefore, another important object of the present invention is to provide an improved process that is particularly suited for uniformly coating articles which, during the period of immersion in the fluidized bed, have a substantial portion of the immersed surface in a downwardly facing position, or which have marked irregularities or concavities in their surface. Such articles may include, for instance, ventilators, gears, pump housings, switches, electrical fittings, tanks and vessels, protective caps, bushings, bellows, and innumerable other articles of greater or less complexity of shape.

Many procedures for coating wire produce a coating having an oval rather than a round cross section and hence another important object of the invention is to provide a process for continuously coating shaped articles having round or cylindrical surfaces such as wire.

Other objects and advantages of the invention will be apparent from the following description.

According to the present invention, the article to be coated is immersed in the dense phase of a fluidized bed of layer-forming material while the article is heated to a temperature below the deterioration temperature of the article, but at least as high as the sintering temperature of said layer-forming material, and a localized auxiliary motion is imparted to the particles of coating material. This motion may be transverse to the usual direction of gas flow, or it may be substantially the same direction (i.e. upward). The term transverse has reference to the direction of the flow of the fluidizing gas; that is, ordinarily the bed of pulverulent coating material will rest on a gas-pervious diaphragm such as a porous ceramic plate, through which the gas will pass, thereby to fluidize the bed of powder. The transverse motion will be imparted to the particles in these cases by suitable means which moves them in a horizontal direction, which direction will manifestly be transverse to the ascending current of fluidizing gas. The article is maintained in the dense phase for a time sufficient to form a uniform layer of desired thickness. In this manner, a uniform layer of coating material on the surface is obtained.

The uniformity of the coating is believed to be derived from the tendency of the auxiliary motion of the particles to carry them into concavities and into areas which would not otherwise be reached or, if reached at all, would not accumulate a sufficient number of particles to produce a coating of desired thickness or uniformity.

The reason for the formation of a uniform coating on wire is not entirely clear. However, whatever the mechanism may be, the results obtained are witness to the utility of this embodiment of the invention. Furthermore, it is not intended to limit the invention to any particular theory.

A fluidized bed is, by definition, a mass of solid particles which exhibits the liquid-like characteristics of mobility, hydrostatic pressure, and an observable upper free surface across which a marked change in concentration of particles occurs. The fluidized bed is thus alternatively defined as a "dense phase". These definitions are to be found in the article entitled "Fluidization Nomenclature and Symbols" appearing at pages 1249 and 1250 of "Industrial and Engineering Chemistry" Vol. 41, No. 6, June 1949.

The localized auxiliary motion of the particles may be imparted by any of a variety of mechanisms such as propellers or air jets as will be described more completely hereinafter and in the drawings.

The invention is particularly valuable for and applicable to the production of coatings from high melting high molecular weight organic polymers or thermoplastic resins such as polyethylene and the linear polyamides generally referred to as nylons. Nylons which are particularly useful are polyhexamethyleneadipamide, polyhexamethylene sebacamide, and the polycaprolactams, such as the polymer of epsiloncaprolactam. However, the uniform protective coatings of this invention may consist of practically any material which (1) will not seriously decompose when temporarily heated above its melting point, and (2) has a melting point lower than the deterioration temperature of the material from which the particular articles to be coated are made.

Among other coating materials which are suitable for the present purposes are thermosetting resins, which are cured by incorporaitng a suitable curing agent in the coating. Various filling materials, including abrasives, may also be added to the coating material.

The coating material, as has been stated above, is preferably used in pulverulent form and preferably has a granular size of between about 0.001 and about 0.024 inch. Best results have been obtained with a granular size of between 0.002 and about 0.012 inch.

Any gas such as nitrogen which is reasonably inert at the temperatures and with the materials employed may be used as the gaseous medium for fluidizing the coating material. Air is usually satisfactory and is preferred for reasons of economy.

When the article is immersed in the fluidized bed, it is heated to a temperature above the melting point of the fluidized material. The fluidized powder flows evenly over all portions of the immersed surface of the article so that every part of the article comes into contact therewith. The important feature of the present invention is that by imparting localized auxiliary motion to the particles of pulverulent coating material even the horizontal downwardly facing surfaces and normally inaccessible recesses and concavities in the article, which heretofore have resisted the accumulation of a uniform coating, do receive a substantially uniform coating.

The thickness of the coating can be largely regulated by regulation of the preheating temperature of the article as well as regulation of the time of immersion.

The best heating temperature for coating in accordance with the process of this invention is very largely dependent upon the size, shape, thickness and heat-storage capacity of the article to be coated. A satisfactory temperature may be found within the confines of the range bounded by the sintering or melting point of the coating material as a lower limit and the melting or softening point of the article to be coated as an upper limit.

The period of immersion in the fluidized bed may vary within relatively wide limits depending upon the thickness of the coating desired. Depending upon the size and heat capacity of the article to be coated, the thickness of the coating desired, the powdered coating material used, and the temperature to which the article is heated, the best immersion time may vary from a fraction of a second upward. Generally, the time of immersion is kept below about 50 seconds, and preferably below about 30 seconds. However, usually an immersion time in the order of 5 or 6 seconds is quite adequate for the production of a coating which completely covers the surfaces on which a coating is desired. When longer immersion times are desired in order to produce an unusually thick coating, it is sometimes preferable to repeat the process of immersion for shorter periods in order to obtain the longer total period of immersion. If the article does not have enough heat to coalesce the adhering powder, it may be postheated.

For the purpose of providing a more complete description of the invention, reference will now be made to the appended drawings.

Figure 1:
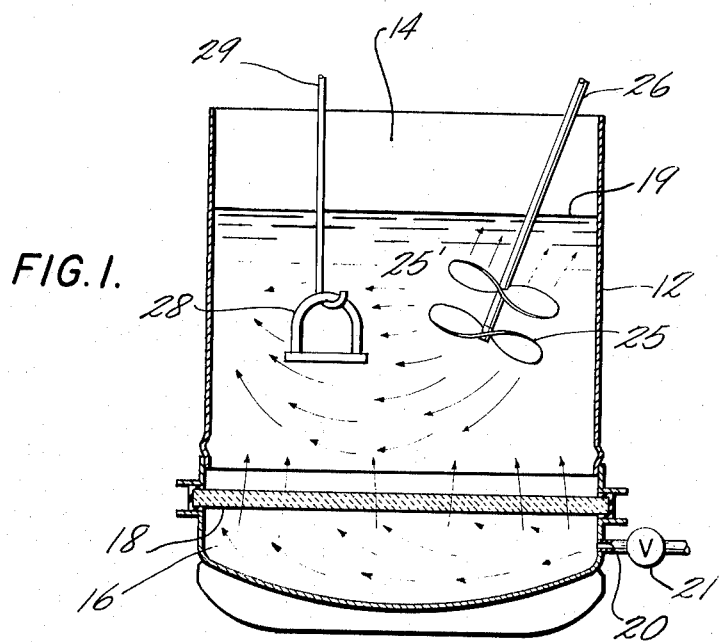
FIG. 1 is a view in cross section of apparatus for fluidizing a pulverulent coating material according to one embodiment of the invention, the section being taken on a vertical plane passing approximately through the center of the apparatus.

Referring to FIGS. 1–7 inclusive, the apparatus for carrying out the invention generally includes an open top container 12 of suitable cross section which is horizontally divided into an upper chamber 14 and a lower chamber 16 by means of a porous partition 18. The partition, which should be pervious to the gas but impervious to the particles of coating material, may preferably take the form of a porous ceramic plate, although other similar structures may be advantageously used. The porous plate preferably has an average pore diameter in the range from 0.003 to 0.004 inch or less.

The powdered coating material 19 is placed on the upper surface of the partition so that the articles to be coated can be at least partially immersed therein. Thereafter a gas under pressure is blown into the lower chamber 16 through the pipe 20 and the valve 21 and penetrates through the porous partition into the powder causing the powder to be converted into a fluidized bed. When fluidized, individual particles become separated from one another and the bed of coating material appears to expand to occupy a greater volume and the upper surface of the coating material therefore rises to an equilibrium level within the container.

In the apparatus shown in FIG. 1 localized auxiliary motion is given to the particles by means of right and left hand propellers 25 and 25' mounted on a shaft 26 which in turn is driven by an electric motor or similar mechanism now shown. The transverse motion, although not perpendicular to the flow of gas, has a substantial transverse component as shown by the arrows and hence accomplishes the object of the invention. The drawing illustrates the coating of a padlock hasp staple 28 which is supported by a hook 29.

Figure 2:
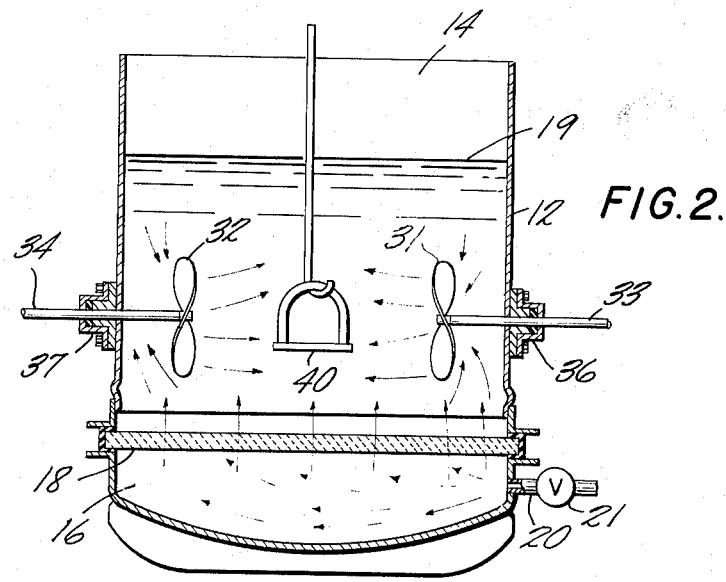
FIG. 2 is a view similar to FIG. 1 illustrating another type of apparatus.

In the apparatus described in FIG. 2, the transverse motion is given to the particles by two propellers 31 and 32 which are mounted integrally on shafts 33 and 34. The latter shafts rotate in bearings or packing glands shown generally at 36 and 37. The horizontal arrows indicate approximately the direction of the transverse motion of the particles in coating the hasp staple 40.

Figure 3:
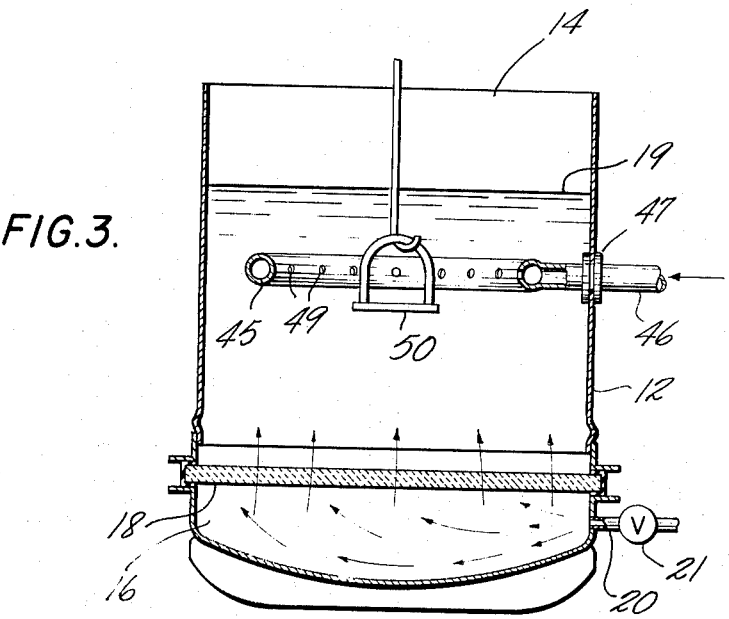
FIG. 3 is another view similar to FIG. 1 illustrating still another embodiment of the invention.

FIG. 3 illustrates an embodiment of the invention in which the transverse motion is induced by means of auxiliary air. A hollow ring-type manifold 45 is located within the fluidized bed and has connected therewith a pipe 46 for supplying gas. A packing assembly 47 prevents the escape of powder. The gas which enters through the pipes 46 flows around the manifold and eventually leaves through a multiplicity of orifices or jets 49 so as to set up a number of currents of gas and thereby impart transverse motion to the particles in coating the hasp staple 50.

Figure 4:
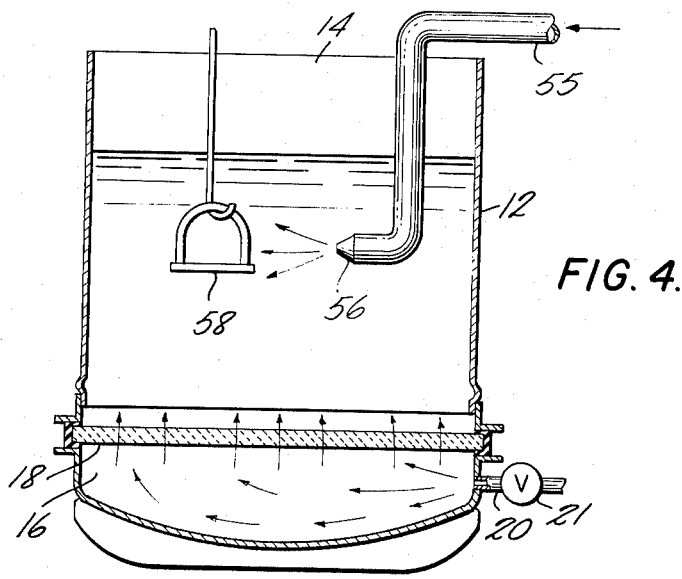
FIG. 4 is also a view similar to FIG. 1 illustrating still another embodiment of the invention.

The apparatus of FIG. 4 is another of the devices which uses air as a means for imparting transverse motion to the particles. A pipe 55 mounted on a support not shown supplies air or other auxiliary gas to a nozzle 56 which directs the air and the particles of coating material entrained thereby toward the hasp staple 58. Instead of the nozzle 56, an auxiliary vertical porous plate not shown in the drawings may be provided. Such a plate could be mounted either in the side of the container 12, or by any other suitable means. Gas would be supplied thereto in the same way that gas is upplied to the bottom of plate 18, and the flow of gas through the plate will set the particles in the desired transverse motion.

Figure 5:
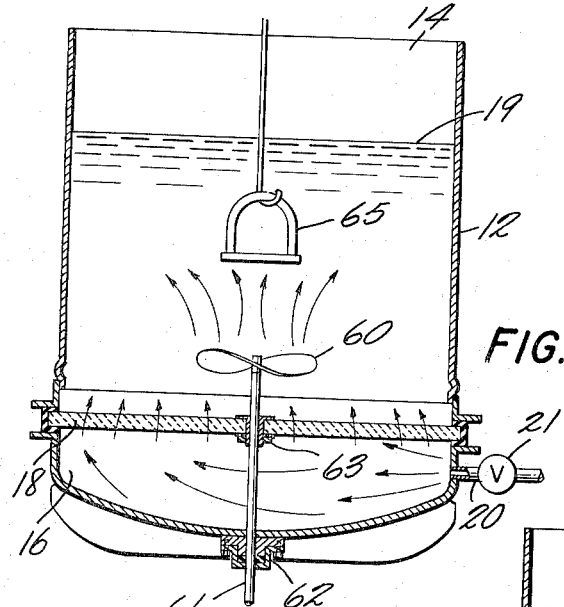
FIG. 5 is a view similar to FIG. 1 but illustrating another embodiment of the invention.
Figure 6:
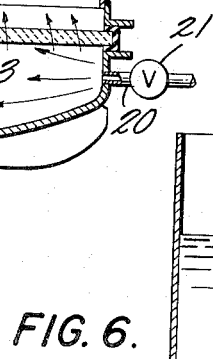
FIG. 6 is another view similar to FIG. 1 illustrating another embodiment of the invention.
Figure 7:
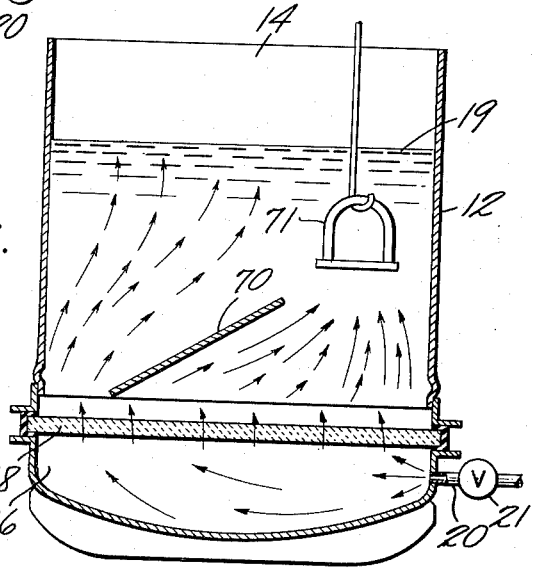
FIG. 7 is also a view similar to FIG. 1 illustrating another embodiment of the invention.
Figure 7:
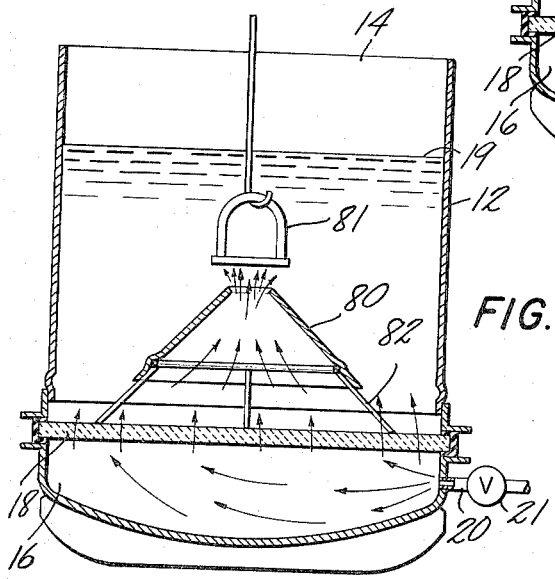

In the apparatus shown in FIGS. 5, 6 and 7, the localized auxiliary motion is imparted in an upward direction, i.e., co-current to the main gas stream. In FIG. 5, for instance, a propeller 60 is mounted on a shaft 61 which passes through the packing glands and bearings 62 and 63 in the tank bottom and porous partition, respectively. When the propeller 60 turns, it forces the particles upwardly as shown by the arrows toward the bottom surface of the hasp staple 65.

In FIG. 6 a baffle 70 is utilized to deflect a portion of the fluidizing gas in the manner shown by the arrows toward the bottom surface of the hasp staple 71. In the apparatus in FIG. 7 a funnel-shaped baffle 80 is employed, as in FIG. 6, to divert a portion of the fluidized gas and thereby impart auxiliary motion to the particles of coating material as shown by the arrows. The funnel 80 rests on a tripod 82 which in turn is supported by the porous plate. The auxiliary motion results in a stream flowing toward the bottom surface of the hasp staple 81.

Figure 8:
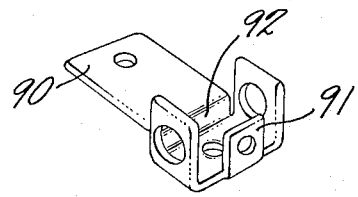
FIG. 8 is an isometric view of a metal stamping that has been coated by the process of the invention.

As pointed out, the invention may be advantageously applied to coating a wide variety of types of articles. The metal stamping shown in FIG. 8 is but one example. Depending upon the shape of the article and the position in which it is held in the fluidized bed, problems of greater or less severity and complexity will be presented from the standpoint of forming a uniform layer on the surface. Nearly every article will raise one problem or another in this regard. When the metal stamping shown in FIG. 8 is held so that the arm 90 is in a vertical position, the portions of the article that will probably give the most trouble are the downwardly facing surface 91 and the cavity 92. It has been found that when the present invention is used in coating this type of article, coatings of much better uniformity are obtained compared with a process that is identical except that there is no auxiliary movement of the particles.

The following examples are presented for the purpose of illustrating how the invention may be carried out with articles of certain shapes and using certain types of mechanisms for imparting auxiliary motion to the particles. However, it will be apparent that there are many modifications and equivalents within the scope of the invention and there is no intention to limit the invention to the procedures nor to the apparatus described in the examples.

*Example 1*

The coating material was plasticized, heat-stabilized cellulose acetate butyrate having a particle size corresponding to under 70 mesh. The body of the powder was placed in a fluidizing vessel of the type shown in FIG. 3 and was fluidized. Air was forced through the holes 49 in the copper tubing ring 45 to impart transverse motion to the coating particles. Intricately contoured concave-shaped zinc die castings (motor housing ends) were preheated to 575–600° F. and immersed and held stationary in the fluidized bed in the position shown in phantom in FIG. 3 for 8 seconds and then withdrawn. A uniform coating of .015 inch thickness was formed over the entire surface of the article. A similar test on the same type of article in which no air was flowing through the openings of the copper ring was carried out and the coating on the article had many pinholes and bare places especially in the recesses and downwardly facing surfaces.

*Example 2*

The same type of article as described in Example 1 was coated with the same pulverulent coating material but in the apparatus described in FIG. 4 in which the transverse motion was imparted to the powder by an air spray or nozzle having a ¼ inch diameter orifice. The article was held substantially stationary during the period of immersion. A coating of .015 inch thickness uniformly covering the entire surface of the article was obtained.

*Example 3*

The procedure described in Example 1 was repeated except that the coating material was a heat stabilizer polyvinyl chloride formulation containing 59 parts plasticizer per 100 parts of polyvinyl chloride and the articles to be coated were small steel stampings described in FIG. 8. When the air was injected through the copper ring a coating was produced on the stampings that was substantially uniform and covered the entire article. However, when no air was supplied through the ring, there were bare spots and pinholes particularly on the downward facing horizontal surfaces.

*Example 4*

A fluidized bed of pulverulent plasticized heat stabilized cellulose acetate butyrate was maintained in apparatus of the type shown in FIG. 2 except that only one propeller-type stirrer was mounted in the side of the tank. The blade was turned at about 200 to 300 r.p.m. so as to impart the transverse motion to the fluidized pulverulent particles. A padlock hasp staple having a rectangular base 1¼ inches by 1½ inches was heated to 675° F. and immersed and held stationary in the fluidized bed at a point approximately opposite the rotating propeller. The base plate was downwardly facing and substantially horizontal. The staple was immersed for 5 seconds and then withdrawn to permit the powder adhering thereto to fuse into a smooth coating. The coating was substantially uniform covering the entire staple and having a thickness of .012 inch. In another test in all respects the same except that the propeller was stationary, the hasp staple had many pinholes and bare spots on its downwardly facing surface.

*Example 5*

A propeller-type agitator with right and left hand propellers mounted on the same axis as shown in FIG. 1 was supported in a tank containing a fluidized bed, the propeller shaft being mounted at an angle of about 30° from the vertical. The pulverulent coating material was polyhexamethylene adipamide. While rotating the propellers at 200–300 r.p.m. a steel test panel preheated to 600° F. was immersed in the fluidized bed and held there for 2–3 seconds and then removed. The powder fused on the article to form a substantially uniform coating of .008 inch thickness covering the entire article.

*Example 6*

Using the apparatus and procedure described in FIGURE 7 a fluidized bed of the vinyl resin described in Example 3 was prepared and a hasp staple was preheated to 600° F. and inserted and held stationary in the fluidized bed in the position shown at 81 in FIGURE 7. An improved continuous coating was obtained which was substantially better than a coating prepared under conditions which were similar except that the funnel was not present.

*Example 7*

Using the same pulverulent coating material as in Example 6, a hasp staple was coated in a fluidized bed of the coating material containing a baffle which produced a localized upward auxiliary motion of the particles of the type produced by the baffle 70 in FIGURE 6. The padlock hasp staple was held in the region of localized upward auxiliary motion of the particles as shown in FIGURE 6. A continuous and improved coating was obtained as compared with a similar test in which no baffle was present and the article was held stationary in the fluidized bed.

It will be apparent that although specific embodiments of the invention have been described there are many modifications and equivalents within the spirit and scope of the invention. For example, although certain operations and apparatus have been described in which the auxiliary motion of the particles is perpendicular to the flow of the gas in the fluidized bed, it will be apparent that the auxiliary motion need not be exactly perpendicular but only that it have a component that is normal to the flow of gas.

I claim:
1. In a coating apparatus of the type for the production of sintered coatings on articles, a coating chamber with upstanding wall retaining means, said coating chamber having an open top permitting the easy insertion of articles to be coated therein and a gas permeable bottom impervious to and adapted to support a bed of pulverulent fluidizable coating material thereon, means to insert a gas under pressure from below said gas permeable bottom to pass through said bottom into said coating chamber in a substantially vertical direction to thereby form a fluidized bed of coating material in the coating chamber, and auxiliary motion means within the coating chamber, said auxiliary motion means comprising an air jet device positioned at a location which is distant from the wall retaining means and away from the gas permeable bottom and which is effective to move the coating material in a substantially horizontal direction adjacent the article to be coated.

2. The coating apparatus of claim 1 wherein said auxiliary motion means is a ring-shaped manifold having a plurality of inwardly directed nozzles.

References Cited by the Examiner

UNITED STATES PATENTS

| | | | |
|---|---|---|---|
| 1,276,466 | 8/1918 | Wickstrom | 117—104 |
| 2,166,250 | 7/1939 | Herman | 118—429 X |
| 2,292,897 | 8/1942 | Nielsen. | |
| 2,357,536 | 9/1944 | Morse | 118—429 X |
| 2,554,803 | 5/1951 | Wysocki | 118—429 X |
| 2,586,818 | 2/1952 | Harms. | |
| 2,689,787 | 9/1954 | Ogorzaly et al. | 202—28 X |
| 2,717,869 | 9/1955 | Turner | 202—28 X |
| 2,750,681 | 6/1956 | Berry. | |
| 2,758,564 | 8/1956 | Randall | 118—309 |
| 2,785,478 | 3/1957 | Audas et al. | |
| 2,815,550 | 12/1957 | Valyi | 22—10 |
| 2,844,489 | 7/1958 | Gemmer | 117 21 X |
| 2,897,778 | 8/1959 | Held et al. | 118—48 |

FOREIGN PATENTS 1,005,413  3/1957  Germany.

OTHER REFERENCES

Plastverarbeiter, September 1956, pp. 342–348.

WILLIAM D. MARTIN, *Primary Examiner.*

RICHARD D. NEVIUS, *Examiner.*